US 8,171,893 B2

(12) United States Patent
Morin et al.

(10) Patent No.: US 8,171,893 B2
(45) Date of Patent: May 8, 2012

(54) OXYGEN-PRODUCING OXYCOMBUSTION BOILER

(75) Inventors: Jean-Xavier Morin, Neuville aux Bois (FR); Corinne Beal, Voisins le Bretonneux (FR); Silvestre Suraniti, Aix en Provence (FR)

(73) Assignee: ALSTOM Technology Ltd

( * ) Notice: Subject to any disclaimer, the term of this patent is extended or adjusted under 35 U.S.C. 154(b) by 0 days.

(21) Appl. No.: 10/590,357

(22) PCT Filed: Feb. 22, 2005

(86) PCT No.: PCT/FR2005/050113
§ 371 (c)(1),
(2), (4) Date: Sep. 14, 2006

(87) PCT Pub. No.: WO2005/085708
PCT Pub. Date: Sep. 15, 2005

(65) Prior Publication Data
US 2007/0175411 A1    Aug. 2, 2007

(30) Foreign Application Priority Data
Feb. 25, 2004    (FR) ..................... 04 50350

(51) Int. Cl.
*F23C 10/18*    (2006.01)
(52) U.S. Cl. ............... 122/4 D; 432/58; 110/245
(58) Field of Classification Search .......... 122/4 D; 432/14–17, 58, 77–80; 110/243–245
See application file for complete search history.

(56) References Cited

U.S. PATENT DOCUMENTS

| | | | | | |
|---|---|---|---|---|---|
| 4,207,382 | A | * | 6/1980 | Zaromb | 429/19 |
| 4,966,101 | A | * | 10/1990 | Maeda et al. | 122/4 D |
| 5,054,436 | A | * | 10/1991 | Dietz | 122/4 D |
| 5,108,465 | A | * | 4/1992 | Bauer et al. | 95/54 |
| 5,239,946 | A | * | 8/1993 | Garcia-Mallol | 122/4 D |
| 5,284,583 | A | * | 2/1994 | Rogut | 95/54 |
| 5,306,411 | A | * | 4/1994 | Mazanec et al. | 204/265 |
| 5,326,550 | A | * | 7/1994 | Adris et al. | 423/652 |
| 5,476,639 | A | * | 12/1995 | Hyppanen | 122/4 D |
| 5,547,494 | A | * | 8/1996 | Prasad et al. | 95/54 |
| 5,852,925 | A | * | 12/1998 | Prasad et al. | 95/55 |
| 5,888,272 | A | * | 3/1999 | Prasad et al. | 95/54 |
| 6,202,574 | B1 | | 3/2001 | Liljedahl et al. | |
| 6,331,283 | B1 | * | 12/2001 | Roy et al. | 423/652 |
| 6,355,093 | B1 | * | 3/2002 | Schwartz et al. | 95/56 |
| 6,382,958 | B1 | * | 5/2002 | Bool et al. | 95/54 |
| 6,505,557 | B2 | | 1/2003 | Desaulniers et al. | |
| 6,505,567 | B1 | * | 1/2003 | Anderson et al. | 110/243 |
| 6,532,905 | B2 | * | 3/2003 | Belin et al. | 122/4 D |
| 6,539,719 | B2 | | 4/2003 | Prasad et al. | |
| 6,562,104 | B2 | | 5/2003 | Bool, III et al. | |
| 6,702,570 | B2 | * | 3/2004 | Shah et al. | 95/54 |
| 6,745,573 | B2 | | 6/2004 | Marin et al. | |
| 7,125,528 | B2 | * | 10/2006 | Besecker et al. | 95/54 |
| 7,954,458 | B2 | * | 6/2011 | Bozzuto et al. | 122/4 D |
| 2002/0073938 | A1 | * | 6/2002 | Bool et al. | 122/451.1 |
| 2004/0244356 | A1 | * | 12/2004 | Ronney | 60/200.1 |
| 2005/0031531 | A1 | * | 2/2005 | Stein et al. | 423/579 |
| 2005/0036940 | A1 | * | 2/2005 | Grace et al. | 423/652 |
| 2006/0013762 | A1 | * | 1/2006 | Kuipers et al. | 423/651 |

* cited by examiner

Primary Examiner — Gregory A Wilson
(74) Attorney, Agent, or Firm — Robert D. Crawford

(57) ABSTRACT

The boiler of the invention has a circulating fluidized bed, uses solid fuels and the oxygen obtained by high temperature oxygen production membranes, and is characterized in that the membranes are placed in the bed. These membranes are, for example, of the OTM (Oxygen Transport Membranes) type. Since the membranes operate at over 700° C., their positioning in the outer bed is ideally selected because the temperature of the solids circulating in the outer bed is between 750 and 900° C. This is particularly remarkable because the operating temperature windows of the circulating fluidized bed coincide with the optimal temperature window of use of the membranes.

29 Claims, 6 Drawing Sheets

OXYGEN-PRODUCING OXYCOMBUSTION BOILER

BACKGROUND OF THE INVENTION

The present invention relates to electric power plant boilers and more particularly to those using solid fuels containing carbon materials.

In general, this type of boiler uses air as the oxidizer. This technology is proven, but it must contend with the new requirements to capture $CO_2$ in the flue gases issuing from the combustion of these carbon materials before release into the atmosphere.

The $CO_2$ present in the flue gases can obviously be selectively extracted, but because of their low content (15% by volume), this postcapture proves to penalize efficiency and is extremely costly.

To decrease the quantity of $CO_2$ produced, it is known from the proprietor's patents U.S. Pat. Nos. 6,202,574 and 6,505,567 to carry out the combustion using oxygen, no longer diluted in nitrogen as in the air, but oxygen diluted in recycled $CO_2$. The boiler thereby only produces a gas stream of $CO_2$ and water vapor, which can be dried and liquefied for transport to a subsequent use of the $CO_2$ or for underground sequestration.

In this case of $O_2/Co_2$ combustion, the step of selective extraction of the $CO_2$ present in the flue gases, which involves high energy consumption, is eliminated, but a new energy penalization appears, deriving from the electric power consumption associated with the cryogenic production of oxygen, which is the only method available today for producing large quantities of oxygen. The power consumption due to oxygen production is so high as to risk making the oxycombustion technology economically prohibitive.

The high temperature oxygen transport membranes available today are suitable for extracting oxygen from the air. They are used to feed burners like, for example, those described in patent application WO02/077419 or the patents U.S. Pat. Nos. 6,539,719 and 96,562,104. However, these membranes can only be used in gas medium. Moreover, the oxygen issuing from the membrane must be flushed with an auxiliary gas.

SUMMARY OF THE INVENTION

It is the object of the present invention to propose a boiler using oxygen as oxidizer, which offers high efficiency, is highly compact, and at relatively reasonable cost.

The boiler of the invention has a circulating fluidized bed, uses solid fuels and the oxygen obtained by high temperature oxygen production membranes, and is characterized in that the membranes are placed in the bed. These membranes are, for example, of the OTM (Oxygen Transport Membranes) type. Since the membranes operate at over 700° C. (between 700 and 1000° C.), their positioning in the outer bed is ideally selected because the temperature of the solids circulating in the outer bed is between 750 and 900° C. This is particularly remarkable because the operating temperature windows of the circulating fluidized bed coincide with the optimal temperature window of use of the membranes.

According to a first feature, the membranes are traversed by pressurized air. To facilitate the extraction of the air from the membranes, it is slightly pressurized. The air issues from a blower or a compressor, which generates a pressure higher than that prevailing in the fluidized chamber.

According to one particular feature, the membranes are placed in the fluidized solids of the outer bed. The hot solids withdrawn from the main loop of circulating solids provide the heat input to maintain the membranes at the optimal operating temperature, and they ensure the removal of the oxygen from the outer wall of the membranes. The solids also ensure excellent thermal contact with a very high flow of materials flushing the outer walls of the membranes at the proper temperature, thereby improving the oxygen transfer kinetics compared with an exchange on gas alone. Since the heat exchange takes place with solids and not with gas, the membrane area necessary can be lower, which is essential for the compactness and economics of the technology. The possible adjustment of the flow of solids to the membranes allows the adjustment of the temperature of the chambers of the outer bed.

According to another feature, the membranes are placed above the fluidized solids of the outer bed. In this case, the outer bed serves to heat the gas such as recycled $CO_2$ used to fluidize the bed and which then provides the heat input and ensures the removal of the oxygen. The two membrane installations can be advantageously combined in the solids and above the solids.

According to a particular arrangement, the membranes are placed on at least part of the periphery of the perimeter of the lower firebox. This arrangement allows for the possibility of additional membrane areas.

According to another particular arrangement, the membranes make up an assembly resting on the hearth of the firebox. Since the hearth is fluidized by recycled $CO_2$, the membranes can be placed on the hearth of the firebox because the stiffness of the hearth reduces the mechanical stresses on the tubes, thereby allowing the use of long lengths.

According to a first variant, the membranes consist of very long tubes supported by intermediate plates. The intermediate tubesheets may or may not be cooled with inlet and outlet chambers.

According to a second variant, the membranes consist of short tubes with intermediate chambers. The tubes can be arranged in series or in parallel.

According to a third variant, the membranes consist of concentric tubes of which the inner tube serves as support for the outer membrane tube. The inner tube is sufficiently stiff to ensure the mechanical strength of the membranes. The inner tube comprises openings so that the oxygen of the air can pass through the membrane tube placed above, and is sufficiently stiff to improve the mechanical strength of the membranes.

According to a particular arrangement of the third variant, a space is provided between the two tubes. A spacer is placed between the two tubes in order to secure the outer tube. It is traversed by air either in the same direction as the stream in the annular space, and in this case, it comprises openings for communication of the air from the inner tubes to the annular space, or in countercurrent flow, with communication at the end of the tube, and in this case, it does not comprise openings along its length.

According to another arrangement of the third variant, the air is in countercurrent flow in the space between the two tubes. In this case, the two tubes do not have openings along their length, but communicate via their end. The air hence traverses the first inner tube from end to end, then passes into the intertube space and re-traverses the intertube space in the opposite direction. The advantage of this solution resides in the fact that the air is in direct contact with the membrane along the whole length of the outer tube and not only opposite the openings.

According to another arrangement, a dense fluidized bed is placed along the inside walls of the firebox. In this configuration, the feed to said dense fluidized bed containing the membranes by descending solids collected along the walls of the firebox tends to improve the performance of the boiler at partial load and to reduce its minimum load, because there is no longer any need to rely exclusively on solids withdrawn from the outer flow, which varies considerably according to the load of the boiler, particularly at low load, providing an economic advantage for the operator. The capture zones of the dense bed can directly accommodate the membrane tubes from which the escape of $CO_2$ $O_2$ is directly integrated in the firebox without connecting flues.

According to another feature, the air traversing the membranes is conveyed to a waste heat boiler. The enthalpy of this oxygen-depleted air is recovered by said waste heat boiler, and the depleted air, cooled to low temperature (about 80° C.), being noncorrosive, is directly discharged to the atmosphere via the stack.

According to a supplementary feature, the depleted air waste heat boiler is combined, in a sealed manner, with a waste heat boiler for the flue gases leaving the firebox. The combination of the two waste heat boilers serves to make the installation more compact, but they are separated in a sealed manner so that only air is released to the atmosphere, while the $CO_2$ is transferred to sequestration or storage. In fact, any nontightness between the two boilers decreases the purity of the $CO_2$ by the introduction of nitrogen and oxygen, which may compromise the final use of the $CO_2$.

BRIEF DESCRIPTION OF THE DRAWINGS

The invention will be better understood from a reading of the description that follows, provided exclusively as an example and with reference to the drawings appended hereto, in which.

DETAILED DESCRIPTION OF THE PREFERRED EMBODIMENT

Figure 1:
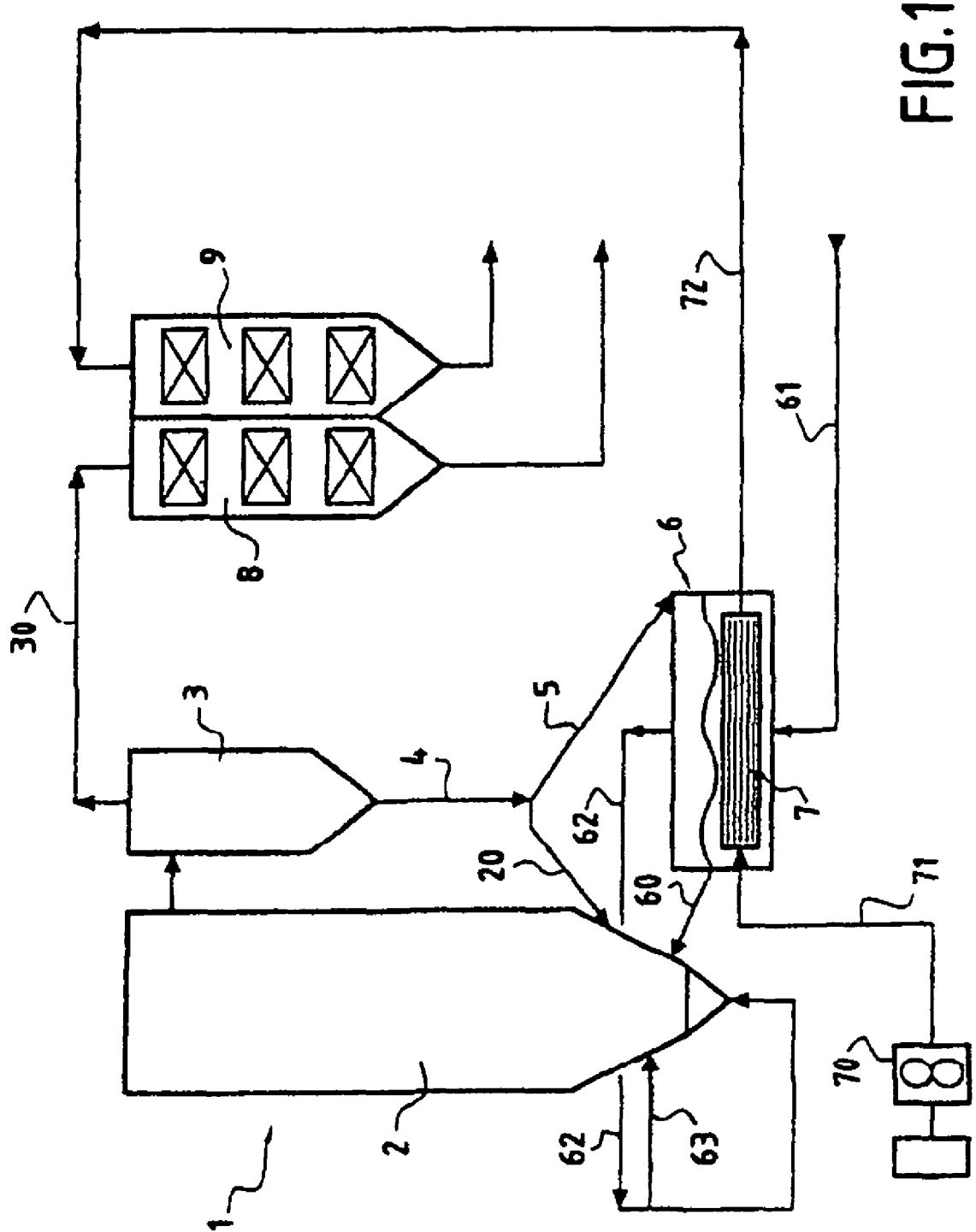
FIG. 1 is a general view of a boiler of the invention.

As shown in FIG. 1, the fluidized bed boiler 1 comprises a firebox 2 and a cyclone or separator 3 for separating the solids present in the flue gases, a solids recirculation loop 4, a solids extraction 5 to a dense fluidized bed 6, called the outer bed, containing a set of membranes 7.

A line 30 conveys the flue gases issuing from the cyclone 3 to a waste heat boiler 8.

The outer bed 6 receives the solids 67 via the extraction line 5, and the solids are then reinjected into the firebox 2 via the line 60. The bed 6 is fluidized by recycled $CO_2$ arriving via the line 61 and then exits via the line 62 for reintroduction into the firebox 2 by injectors 63 placed at several levels.

The external air enters via a blower or compressor 70 and is sent to the bed 6 via the line 71, then passes through the membranes 7 to exit via the line 72, which sends the depleted air to a waste heat boiler 9, the air then being discharged into the atmosphere.

We shall now describe the circulation of the air in the boiler 1 in FIG. 1. The air arrives via the line 71 after having been pressurized by the blower 70, the pressure must be slightly higher than the pressure prevailing in the chamber of the bed 6 in order to promote the extraction of the oxygen from the air. The depleted air is sent via a line 72 to the waste heat boiler 9, where it is cooled and then released to the atmosphere.

The solids are separated in the cyclone 3 and sent via the line 4 either to the bed 6 via 5, or via the direct return line 20 to the firebox 2. The solids reaching the bed 6 are cooled and reinjected into the lower part of the firebox 2.

The bed 6 is fluidized by gas such as recycled $CO_2$ arriving via the line 61, this fluidization gas is mixed with the oxygen produced by the membranes 7 and is then conveyed to the lower part of the firebox 2 via the lines 62.

Figure 2:
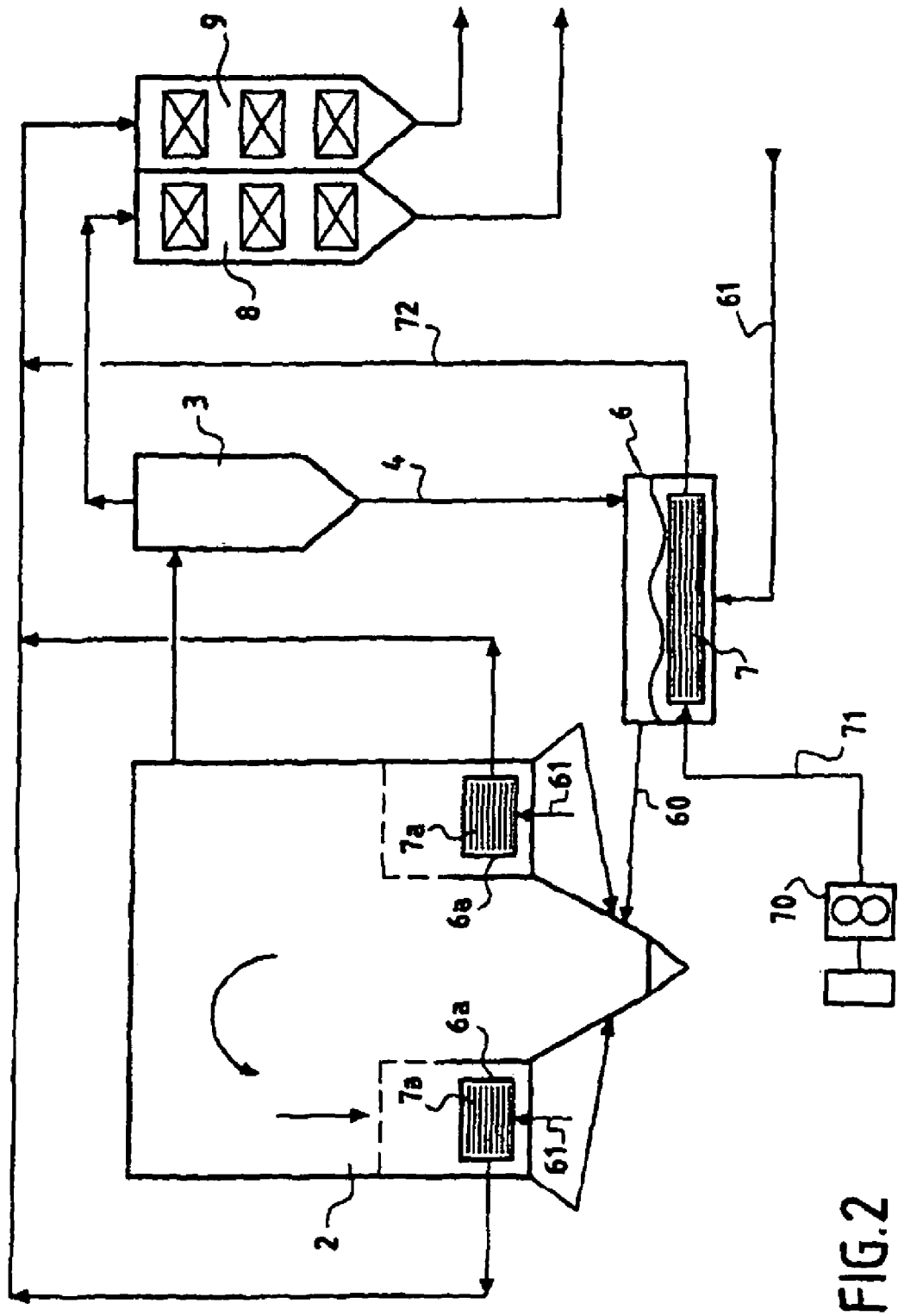
FIG. 2 is a general view of a boiler with the variant of a bed placed in the firebox.

In the variant shown in FIG. 2, a dense fluidized bed 6a is placed in the bottom of the firebox 2, and contains the membranes 7a. The descending solids are then collected along the wall of the firebox 2 and fall into the bed 6a located on part or all of the periphery of the firebox 2. A fluidizing gas, such as recycled $CO_2$, traverses the bed 6a and is mixed with the oxygen released by the membranes 7a, and directly emerges in the firebox 2 without requiring connecting flues.

We shall now describe the arrangement of the membranes in the bed 6 or 6a.

Figure 3:
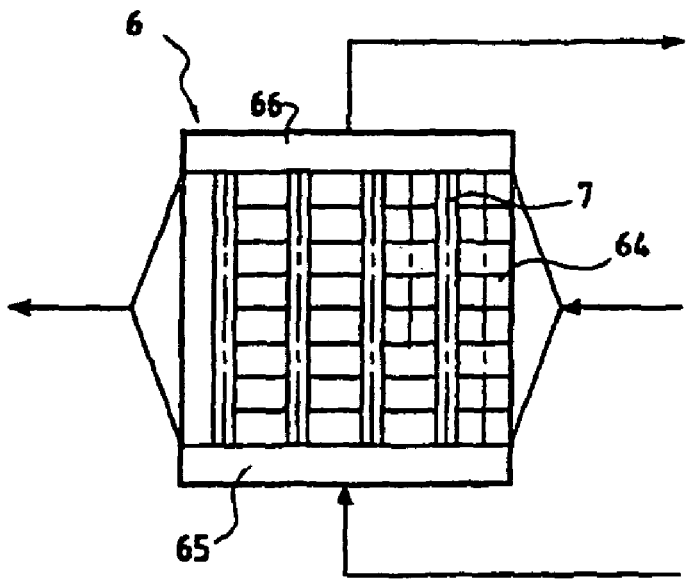
FIG. 3 is a detailed view of the bed with a first arrangement of the membranes.

In the variant shown in FIG. 3, the membranes 7 are very long and arranged in the length of the bed 6 and secured by intermediate tubesheets 64 which may or may not be cooled. The air enters via the inlet chamber 65 and leaves via the outlet chamber 66.

Figure 4:
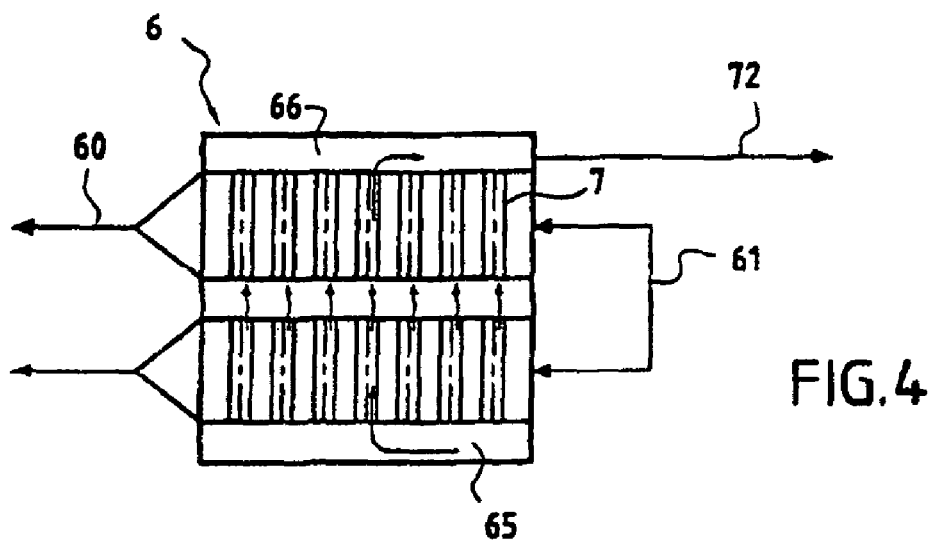
FIG. 4 is a detailed view of the bed with a second arrangement of the membranes.
Figure 5:
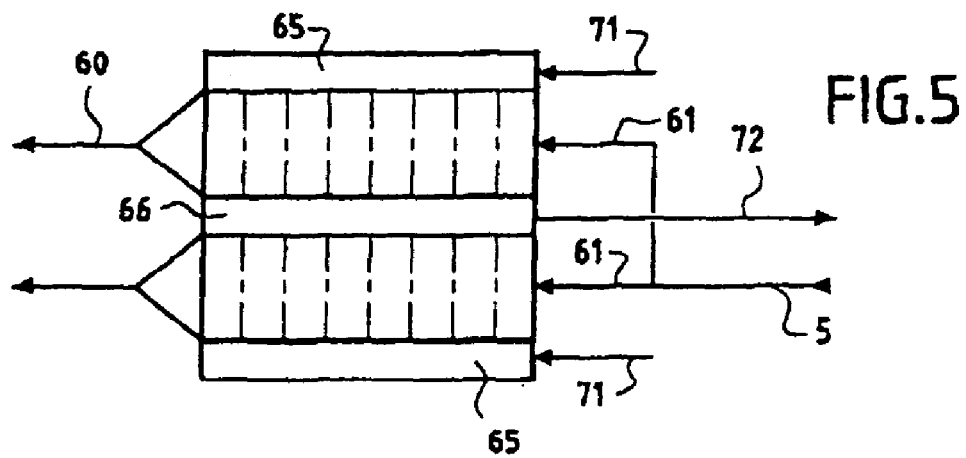
FIG. 5 is a detailed view of the bed with a third arrangement of the membranes.

The variants shown in FIGS. 4 and 5 correspond to a bed 6 in which the membranes 7 consist of short tubes which are placed between the intermediate inlet 65 and outlet 66 chambers arranged in series (FIG. 4) or in parallel (FIG. 5).

Figure 6:
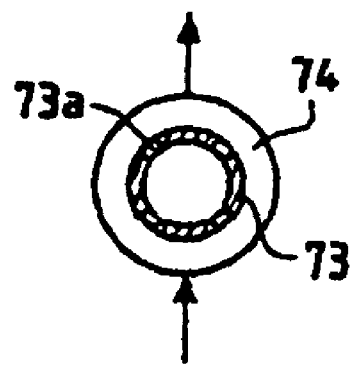
FIG. 6 is a detailed view of a support tube with a membrane.

The variant shown in FIG. 6 is a membrane 7 consisting of a support tube 73 surrounded by the membrane tube 74. The air flows inside the support tube 73 comprising openings 73a which enable the oxygen of the air to be extracted and to traverse the membrane 74.

Figure 12:
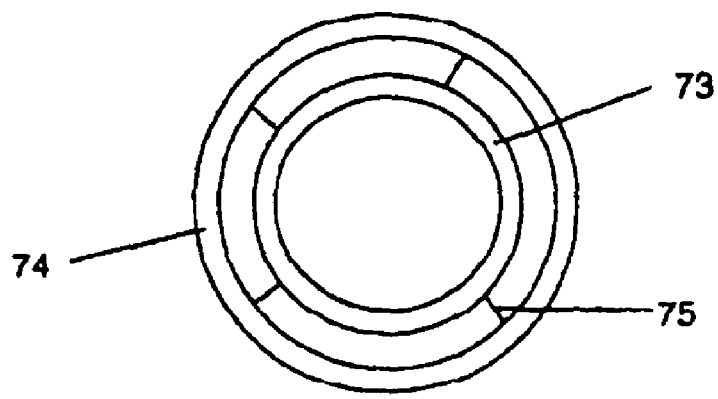
FIG. 12 is a cross section of the third variant with a space between the two tubes.

FIG. 12 shows a particular arrangement of the variant shown in FIG. 6, in which the two tubes 73 and 74 are spaced in order to allow the air to pass through. They are connected together by spacers 75.

Figure 13:
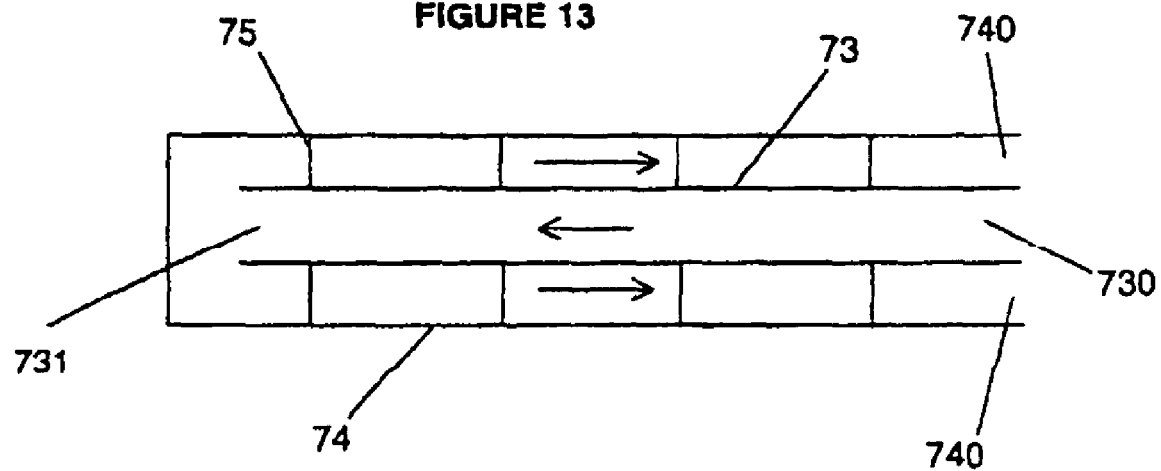
FIG. 13 is a longitudinal section of the third version.

FIG. 13 shows an arrangement in which the two concentric tubes 73 and 74 are only open at their ends 730, 731, and 740. The air flows in the direction of the arrow, enters via the end 730 of the tube 73, exits via the other end 731 which communicates with the tube 74, through which the air flows to the end 740 of the tube 74.

Figure 7:
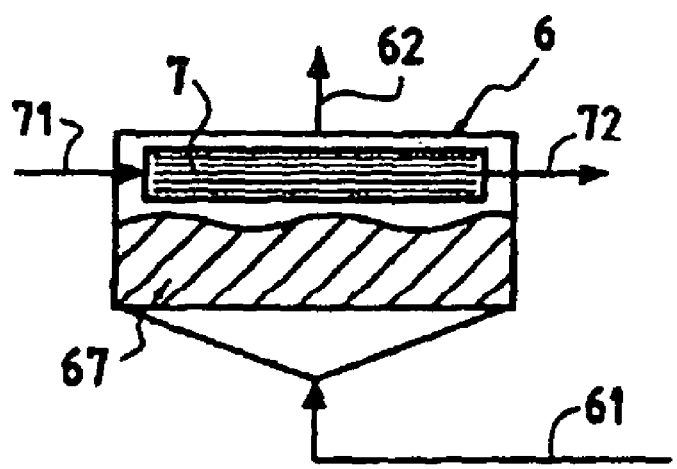
FIG. 7 is a detailed view of the bed with the membranes arranged above the solids of the bed.
Figure 8:
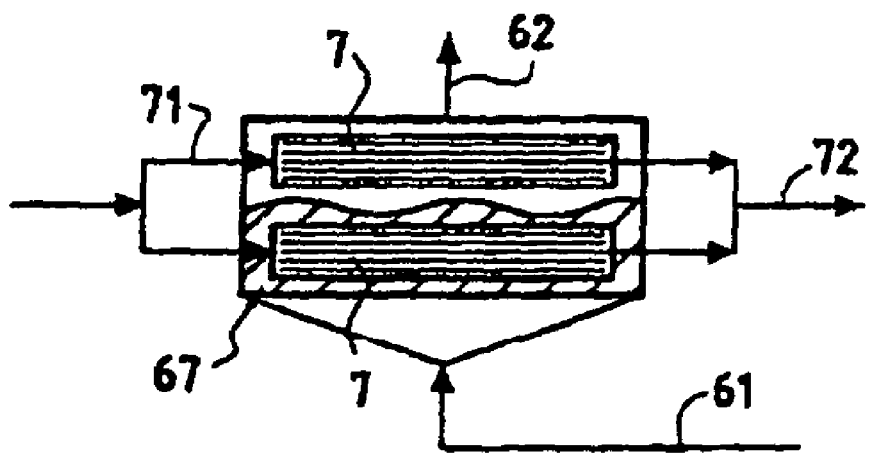
FIG. 8 is detailed view of the bed with the membranes arranged both in and above the bed.

In the variant in FIG. 7, the membranes 7 are arranged in the bed 6 above the solids 67, and in this case, the fluidizing gas (for example, recycled $CO_2$) is heated by the solids 67 and enables the satisfactory operation of the membranes 7 by heating the fluidizing gas to the proper temperature, making it possible to extract the oxygen from the air and remove it.

By combining membranes 7 immersed in the solids and above the solids 67, the membrane area 7 is increased, and hence the potential oxygen production volume, for an identical bed volume.

Figure 9:
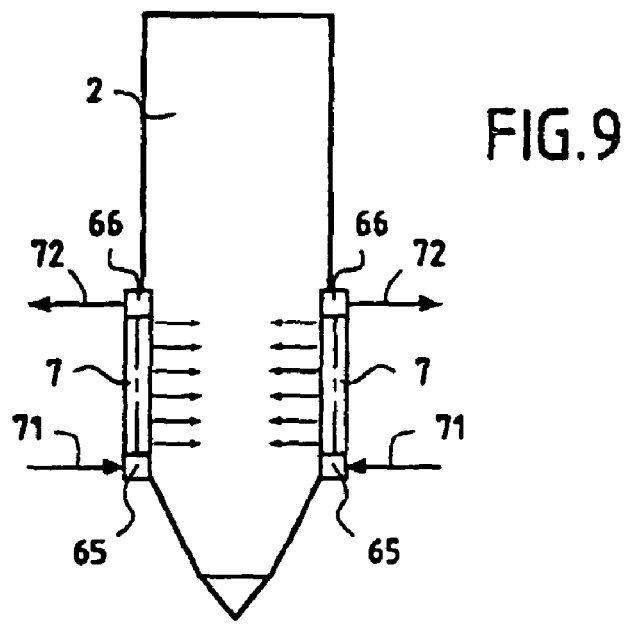
FIG. 9 is a detailed view of the firebox with membranes arranged in the bottom of the firebox.
Figure 10:
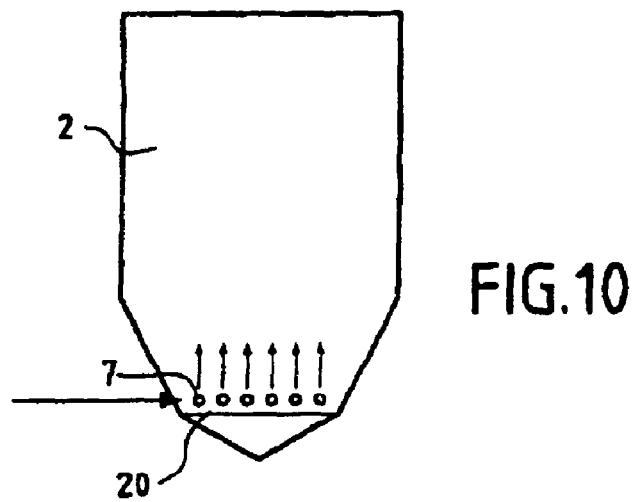
FIG. 10 is a detailed view of the firebox with membranes arranged on the hearth of the firebox.
Figure 11:
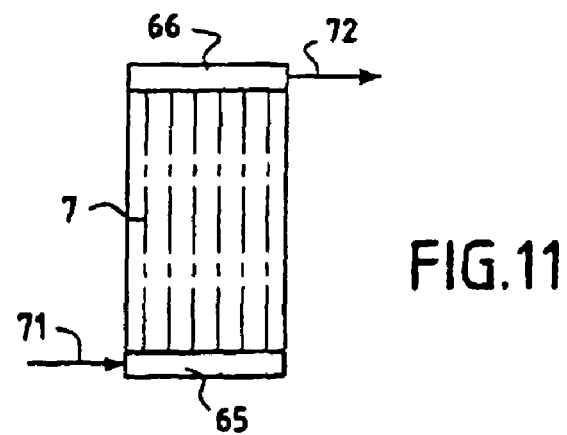
FIG. 11 is plan view of the hearth of the firebox in FIG. 10.

To arrange additional membranes 7, it is possible to place them on the periphery of the perimeter of the lower firebox 2 (FIG. 9) or to create an assembly of them resting on the hearth 20 of the firebox 2 (FIGS. 10 and 11).

In the variant in FIGS. 10 and 11, the membranes 7 are placed on the hearth 20 of the firebox 2 which, due to its stiffness, reduces the mechanical stresses applied to the membranes 7, enabling their use in long lengths.

The invention claimed is:

1. A circulating fluidized bed boiler comprising:
a fire box in which solid fuel is combusted in the presence of oxygen to generate gases containing heated solids;
a fluidized bed containing the heated solids fluidized by a fluidization gas, and an oxygen transport membrane disposed in the fluidized bed, wherein at least a portion of the heated solids contact the oxygen transport membrane transferring heat thereto such that the oxygen transport membrane extracts oxygen from pressurized air provided thereto for combustion in the fire box; and wherein
the heated solids flow over outer walls defined by the membrane removing oxygen therefrom.

2. The circulating fluidized bed boiler of claim 1, wherein the fluidization gas is $CO_2$.

3. The circulating fluidization bed boiler of claim 1, further includes a fluid line for providing a combustion gas that comprises the fluidization gas and the extracted oxygen from the fluidization bed to the firebox.

4. The circulating fluidization bed boiler of claim 1, further includes a fluid pressurizing device that pressurizes the air provided to the oxygen transport membrane.

5. The circulating fluidized bed boiler of claim 1, wherein the oxygen transport membrane is supported within the heated solids in the fluidized bed.

6. The circulating fluidized bed boiler of claim 1, wherein the oxygen transport membrane is disposed above the heated solids in the fluidized bed.

7. The circulating fluidized bed boiler of claim 1, wherein the fluidized bed is disposed within the firebox.

8. The circulating fluidized bed boiler of claim 7, wherein the fluidized bed is open to the firebox for receiving descending heated solids in the firebox.

9. The circulating fluidized bed boiler of claim 8, wherein the fluidized bed extends along a portion of an inner wall of the firebox.

10. The circulating fluidized bed boiler of claim 1, wherein the oxygen transport membrane includes long tubes supported by intermediate plates.

11. The circulating fluidized bed boiler of claim 1, wherein the oxygen transport membrane includes short tubes with intermediate chambers.

12. The circulating fluidized bed boiler of claim 1, wherein the oxygen transport membrane includes concentric tubes, an inner tube of which serves as a support for a tube of outer membrane.

13. The circulating fluidized bed boiler of claim 12, wherein a space is provided between the concentric tubes.

14. The circulating fluidized bed boiler of claim 13, wherein the air flows in counter-current in the space between the tubes.

15. The circulating fluidized bed boiler of claim 1, wherein the oxygen transport membrane is heated to a temperature of approximately greater than 700 degrees.

16. The circulating fluidized bed boiler of claim 1, wherein an oxygen transport membrane is immersed within the heated solids in the fluidized bed and disposed above the heated solids of the fluidized bed.

17. The circulating fluidized bed boiler of claim 1, further including a separator that separates the heated solids from the flue gas to provide at least a portion of the heated solids to the fluidized bed.

18. The circulating fluidized bed boiler of claim 17, wherein at least a portion of the separated heated solids are provided from the separator to the firebox.

19. The circulating fluidized bed boiler of claim 1, wherein at least a portion of the heated solids of the fluidized bed are provided to the firebox.

20. A circulating fluidized bed boiler comprising:
a firebox in which solid fuel is combusted in the presence of oxygen that generates a flue gas containing heated solids;
a fluidized bed external to the firebox containing the heated solids separated from the flue gas, wherein the heated solids are fluidized by a fluidization gas;
an oxygen transport membrane being disposed such that at least a portion of the heated solids of the fluidized bed contact the oxygen transport membrane transferring heat thereto such that the oxygen transport membrane extracts oxygen from pressurized air provided thereto for combustion in the firebox; and wherein
the heated solids flow over outer walls defined by the membrane removing oxygen therefrom.

21. The boiler of claim 20, further includes a fluid pressurizing device that pressurizes the air provided to the oxygen transport member.

22. The boiler of claim 20, wherein the oxygen transport membrane is disposed on the inner periphery of the lower portion of the firebox.

23. The boiler of claim 20, wherein the oxygen transport membrane includes short tubes with intermediate chambers.

24. The boiler of claim 20, wherein the oxygen transport membrane includes concentric tubes, an inner tube of which serves as a support for a tube of outer membrane.

25. The boiler of claim 20, wherein the oxygen transport membrane comprises a plurality of oxygen transport membranes.

26. The boiler of claim 20, wherein the oxygen transport membrane includes tubes disposed horizontally on the hearth of the boiler.

27. The boiler of claim 20, wherein the oxygen transport membrane is heated to a temperature of approximately greater than 700 degrees Celsius.

28. The circulating fluidized bed boiler of claim 20, wherein the oxygen transport membrane is supported within the heated solids in the fluidized bed.

29. The circulating fluidized bed boiler of claim 20, wherein the oxygen transport membrane is disposed above the heated solids in the fluidized bed.

* * * * *